(12) United States Patent
Divakara et al.

(10) Patent No.: US 9,940,826 B1
(45) Date of Patent: Apr. 10, 2018

(54) SENSOR DATA PROCESSING SYSTEM FOR VARIOUS APPLICATIONS

(71) Applicant: Honeywell International Inc., Morris Plains, NJ (US)

(72) Inventors: Manjunatha Divakara, Bangalore (IN); Sudhindra D. Mewundi, Bangalore (IN); Tomas Brodsky, Cortland Manor, NY (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/439,610

(22) Filed: Feb. 22, 2017

(51) Int. Cl.
G08B 29/00 (2006.01)
G08B 29/18 (2006.01)
G08B 21/18 (2006.01)
H04L 29/08 (2006.01)

(52) U.S. Cl.
CPC ......... *G08B 29/188* (2013.01); *G08B 21/182* (2013.01); *G08B 29/183* (2013.01); *H04L 67/12* (2013.01)

(58) Field of Classification Search
CPC .. G08B 29/188; G08B 21/182; G08B 29/183; H04L 67/12
See application file for complete search history.

(56) References Cited

U.S. PATENT DOCUMENTS

| | | | | |
|---|---|---|---|---|
| 7,952,474 B2* | 5/2011 | Kang | ................... | G08B 29/183 340/506 |
| 8,478,711 B2* | 7/2013 | Abielmona | ............ | G06N 7/005 706/52 |
| 9,057,777 B2* | 6/2015 | Guignard | ................ | G01S 3/802 |
| 2008/0272902 A1* | 11/2008 | Kang | ................... | G08B 29/183 340/506 |
| 2009/0046538 A1* | 2/2009 | Breed | ..................... | B60C 11/24 367/93 |
| 2013/0154823 A1* | 6/2013 | Ostrer | ................... | G08B 21/18 340/539.1 |

(Continued)

FOREIGN PATENT DOCUMENTS

WO 2014098993 A1 6/2014

OTHER PUBLICATIONS

Feng et al., "Multimedia Fusion for Public Security in Heterogeneous Sensor Networks," 12 pages, Hindawi Publishing rporation, Journal of Sensors, vol. 2014, Article ID 273210, Oct. 27, 2014.

*Primary Examiner* — Joseph Feild
*Assistant Examiner* — Rufus Point
(74) *Attorney, Agent, or Firm* — Seager, Tufte & Wickhem, LLP (57) ABSTRACT

A data analysis system and approach having sensors, a collective processing mechanism connected to the sensors, and a threshold logic panel connected to the collective processing mechanism. Raw data from the sensors may be subject to collective processing and collective threshold logic analysis. The collective processing mechanism and the threshold logic panel may be situated outside of or in the cloud. Big data analytics may be performed on the data. The sensors may be homogeneous or heterogeneous. Consequently, there may be data fusion for false alarm reduction and advanced alarm detection, and application of big data analysis. Raw data may be used for determining positional information.

17 Claims, 7 Drawing Sheets

(56) References Cited

U.S. PATENT DOCUMENTS

| | | | |
|---|---|---|---|
| 2015/0198711 A1* | 7/2015 | Zeng | G01S 13/726 342/59 |
| 2016/0057565 A1* | 2/2016 | Gold | H04W 4/008 455/41.1 |
| 2016/0226677 A1* | 8/2016 | Margon | H04L 12/46 |

* cited by examiner

SENSOR DATA PROCESSING SYSTEM FOR VARIOUS APPLICATIONS

BACKGROUND

The present disclosure pertains to sensors and processing data from the sensors.

SUMMARY

The disclosure reveals a data analysis system and approach having sensors, a collective processing mechanism connected to the sensors, and a threshold logic panel connected to the collective processing mechanism. Raw data from the sensors may be subject to collective processing and collective threshold logic analysis. The collective processing mechanism and the threshold logic panel may be situated outside of or in the cloud. Big data analytics may be performed on the data. The sensors may be homogeneous or heterogeneous. Consequently, there may be data fusion for false alarm reduction and advanced alarm detection, and application of big data analysis. Raw data may be used for determining positional information.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

In security panels, currently the sensor data may be processed individually. The secured premises may consist of multiple intrusion sensors within an area. When an alarm is generated, it is not necessarily collectively processed by consolidating the response from multiple sensors. Although a cross zone may solve this problem by getting data individually from each sensor for confirmation, it does not necessarily do collective processing of sensor data.

The present approach may solve the above mentioned issue by collecting the thresholds/present values (e.g., in case of motion detectors, it can be PIR thresholds/microwave intensity) measured by various sensors in secured premises periodically. The data may be received along with the regular supervision message synchronously, along with the usual alarm data which comes on confirmation of an event asynchronously.

The values received synchronously from virtually all the sensors might not have crossed the threshold limits all the time, but the value itself may be of importance in fusing the multiple sensor values and deriving inferences out of a result of a fusion. Today, one may have the capability to query and get the digital values from the sensors such as RF6, ZigBee, and so on.

The data fusion logic may either be implemented at the security panel or be transported to a cloud where big data analytics can be performed on the logic.

Homogeneous sensor data fusion may involve a fusing of data from sensors of similar types, like data from multiple motion detectors. Heterogeneous sensor data fusion may involve fusing of data from sensors of different types, like data from motion detectors, glass break detectors, and so on.

Some systems and approaches may speak to collecting data from multiple sensors to arrive at a pattern analysis to find a sequence of events. In the present system and approach, one may propose targets to consider the data fusion for advanced alarm detection, false alarm detection and localization. The data may be raw.

A methodology of implementation may be explained in the following. A first feature may be homogeneous sensor data fusion. One may consider an example of a motion detector which consists of passive infrared (PIR) and microwave technology. For example, three motion detectors may be placed in a big room at various locations whose view angles and range may overlap just by a minimum amount. A centralized panel may receive an asynchronous alarm from the one or more motion detectors when they sense motion. In addition, there may be a centralized security panel to calculate the "room response" by processing the motion sensor PIR or microwave readings received from each of the motion detectors.

An alarm confirmation scenario may consider that there is a valid alarm generated by one of the motion detectors in the room. One may use sensor values from all of the detectors to calculate a collective "room response" in order to confirm that there was a motion indeed in a field of view. If the values received from all of the detectors or sensors do not indicate of any sort of motion but only one has generated an alarm, one may do an additional verification before flagging an "alarm". For example, a video verification may be used.

An advanced alarm detection scenario may consider that a valid motion has happened in the region of interest but none of the detectors had sensed the motion due to their threshold settings. A centralized security panel may always be looking for sensor values from all of the detectors, periodically. If there are sensor values above normal but below a threshold coming from the detectors or sensors, then the centralized security panel may calculate a collective room response to make a decision on motion detection.

There may be raw input data from the sensors. There may be collective processing of the raw data. Collective threshold logic may be applied. Raw data may also be used for position information. The present system and approach may be applied to a security domain.

Figure 1:
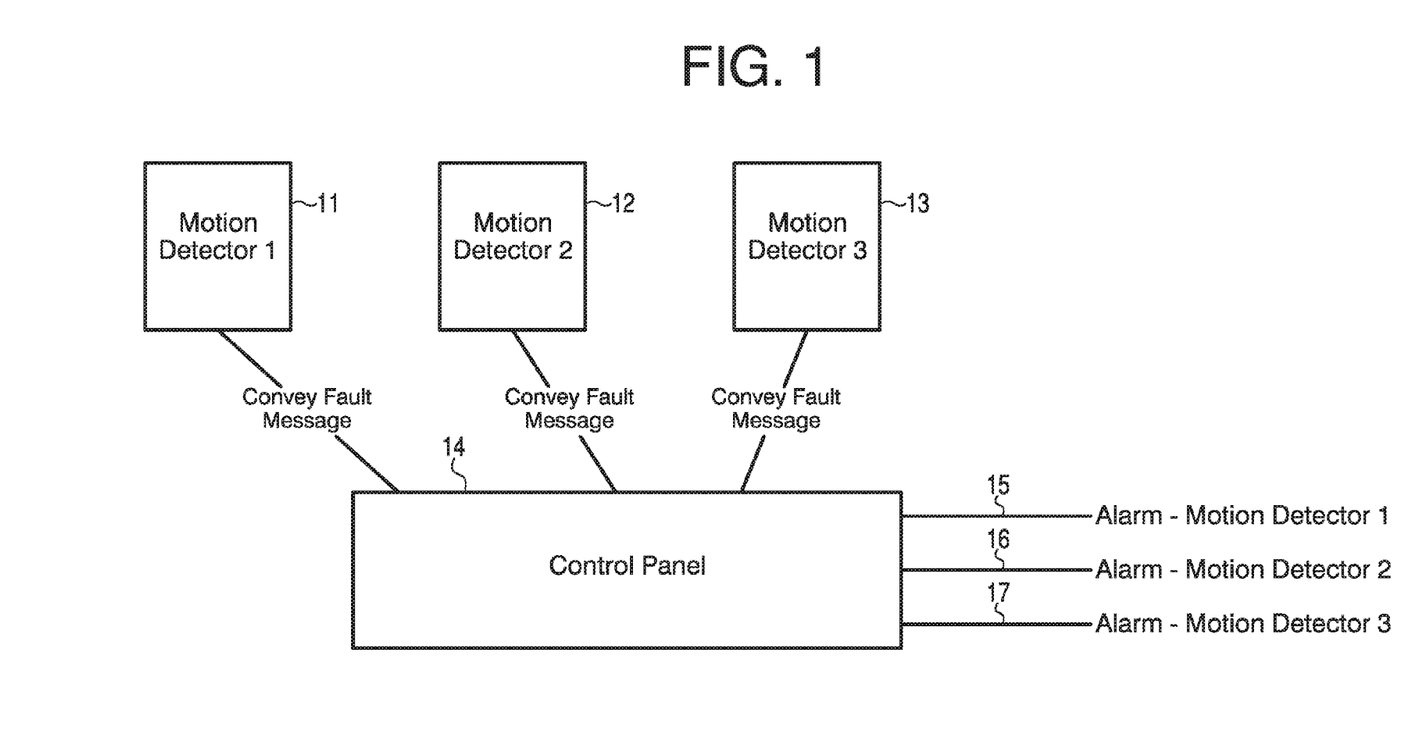
FIG. 1 is a diagram of a methodology where one or more motion detectors may convey fault messages to a control panel which can provide outputs that incorporate alarms relative to the one or more, respectively.
Figure 2:
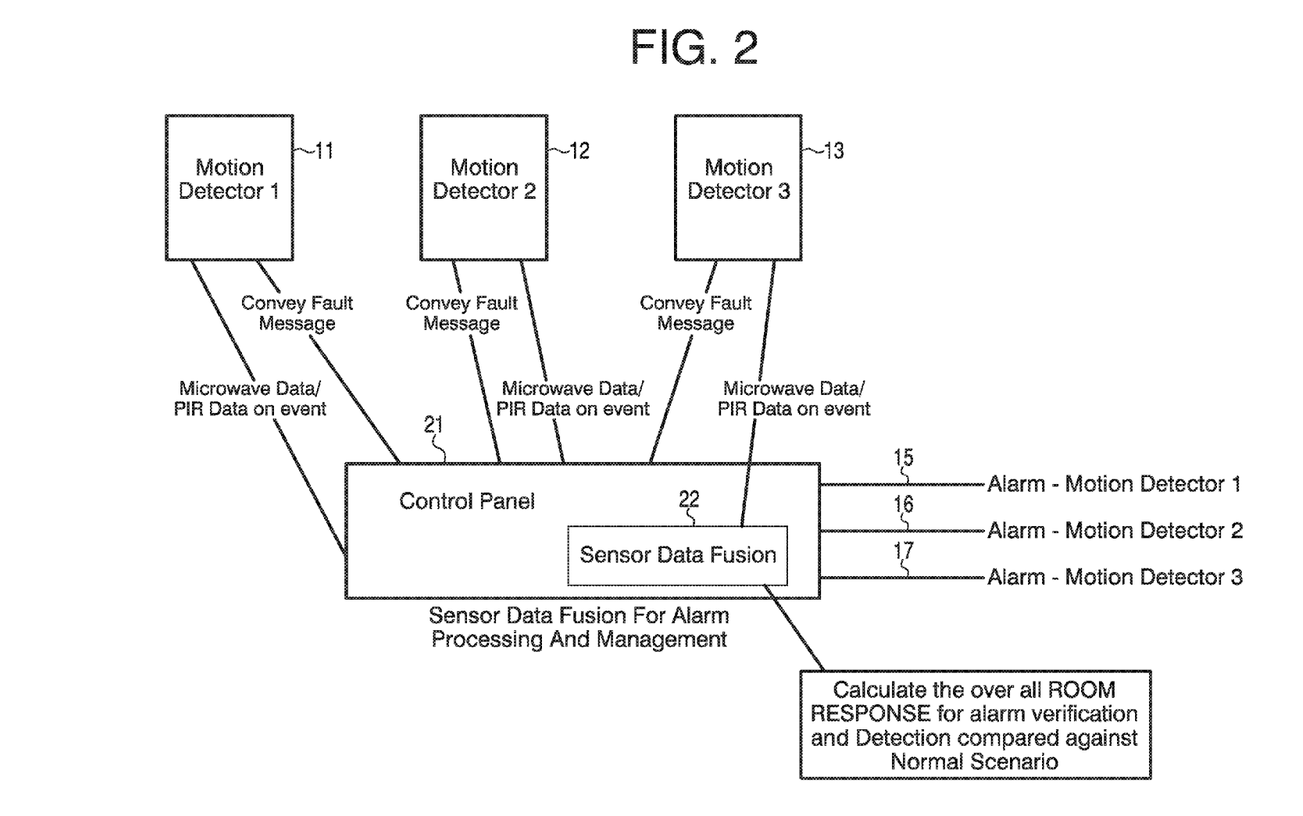
FIG. 2 is a diagram of another methodology that may consist of homogeneous sensor data fusion.

Several methodologies may be noted in FIG. 1 and FIG. 2, respectively. FIG. 1 is a diagram of one methodology. A motion detector 11 may convey a fault message to a control panel 14. Similarly, motion detectors 12 and 13 may convey fault messages to control panel 14. Outputs 15, 16 and 17 from control panel 14 may incorporate alarms for detectors 11, 12 and 13, respectively.

FIG. 2 is a diagram of another methodology consisting of homogeneous sensor data fusion. Besides conveying fault messages, motion detectors 11, 12 and 13 may provide microwave data or PIR data on an event to a control panel 21. The data may be raw. Sensor data fusion 22 for alarm processing and management may occur at panel 21. An overall room response may be calculated for alarm verification and detection compared against a normal scenario.

Figure 3:
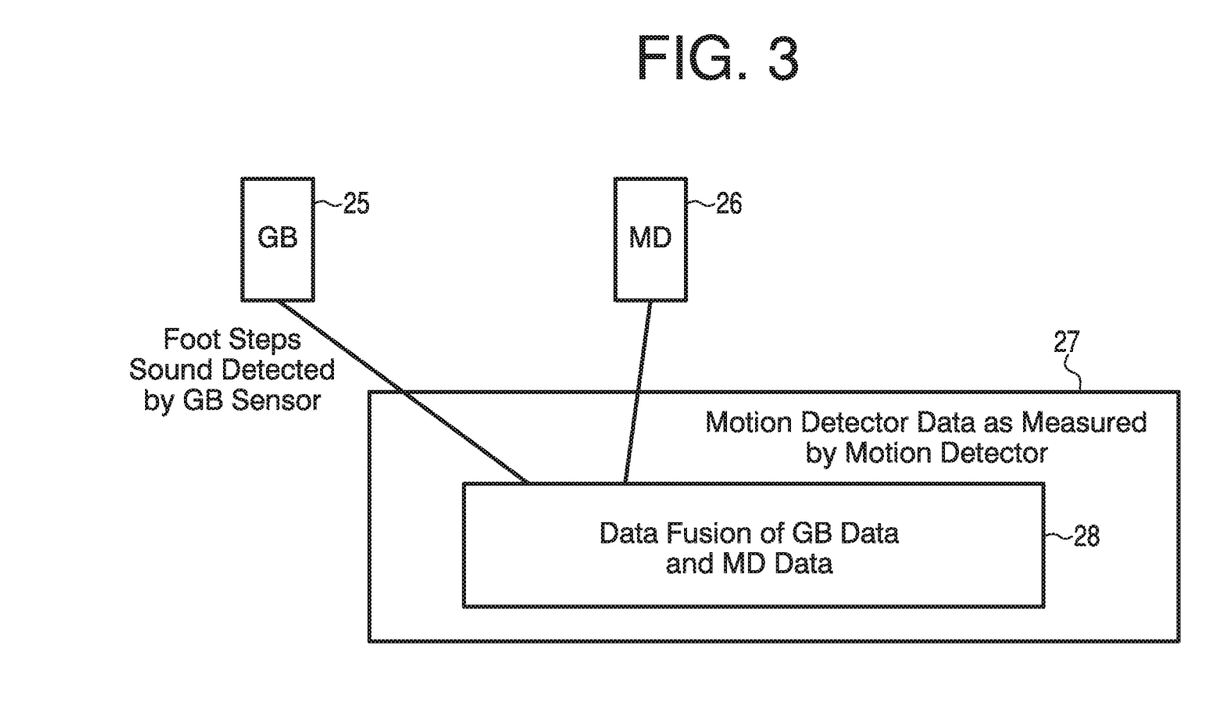
FIG. 3 is a diagram of another methodology that may consist of heterogeneous sensor data fusion.

A second feature may incorporate heterogeneous data fusion. The data may be raw. FIG. 3 is a diagram of heterogeneous sensor data fusion 28. One may note relative to battery life, that the periodicity of the query and response of the measured values for data fusion may be adjusted to fit a need. Sound generated from tapping of footsteps may be captured in an armed away condition by a glass break (GB) detector 25 by digitally processing the audio data. Information from processing the data may be used for verification of an "alarm" generated by a motion detector (MD) 26. If the centralized security panel 27 detects both items, then it may be a confirmed "alarm" for intrusion in the armed away condition.

Figure 4:
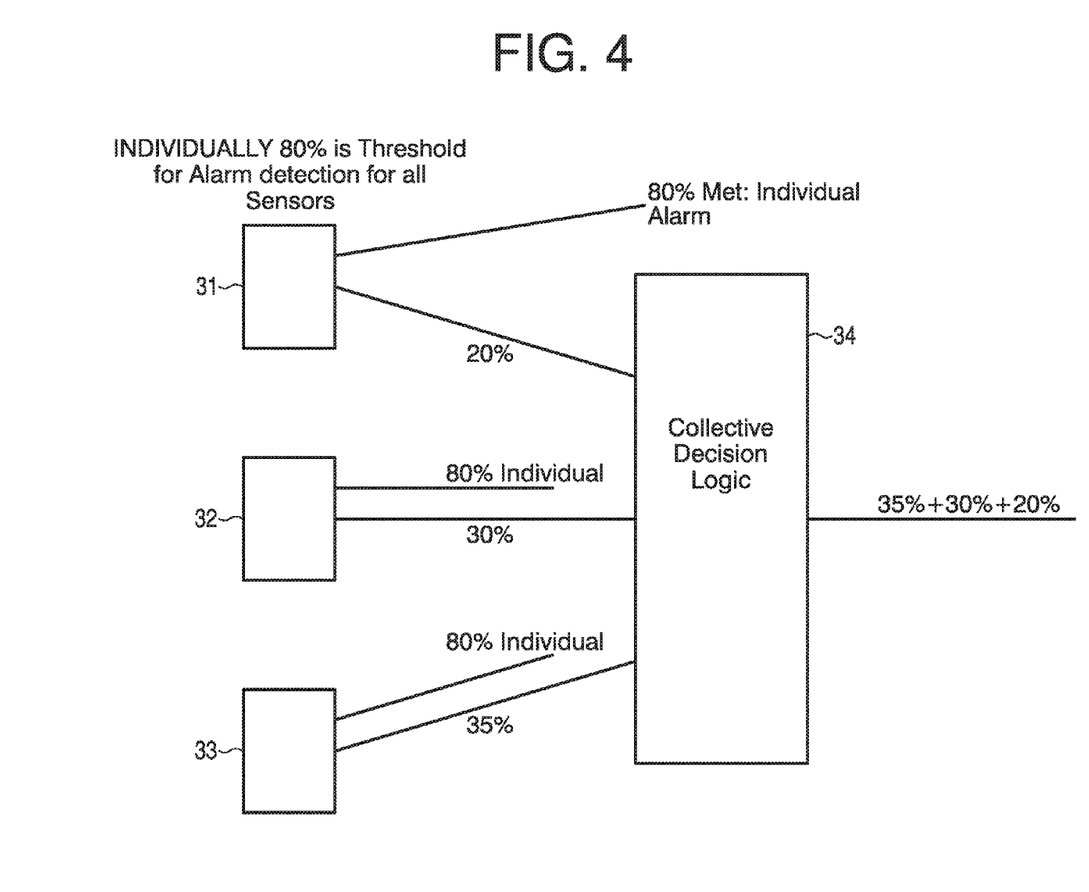
FIG. 4 is a diagram revealing collective data fusion.

FIG. 4 is a diagram revealing collective data fusion. Data fusion may be used to arrive at a collective decision logic at panel 34. An individual sensor threshold may be, for example, 80 percent for all sensors 31, 32 and 33. But the collective decision logic may be implemented at security panel 34, or a cloud may fuse data received from multiple detectors or sensors 31, 32 and 33 to arrive at a "collective room response" and then to arrive at a collective threshold for advanced motion detection. The data may be raw. An 80 percent threshold may be needed for individual alarm detection for the sensors. Detection data may be at 20, 30 and 35 percent for sensors 31, 32 and 33, respectively. A collective decision may be 85 percent at an output of panel 34.

Figure 5:
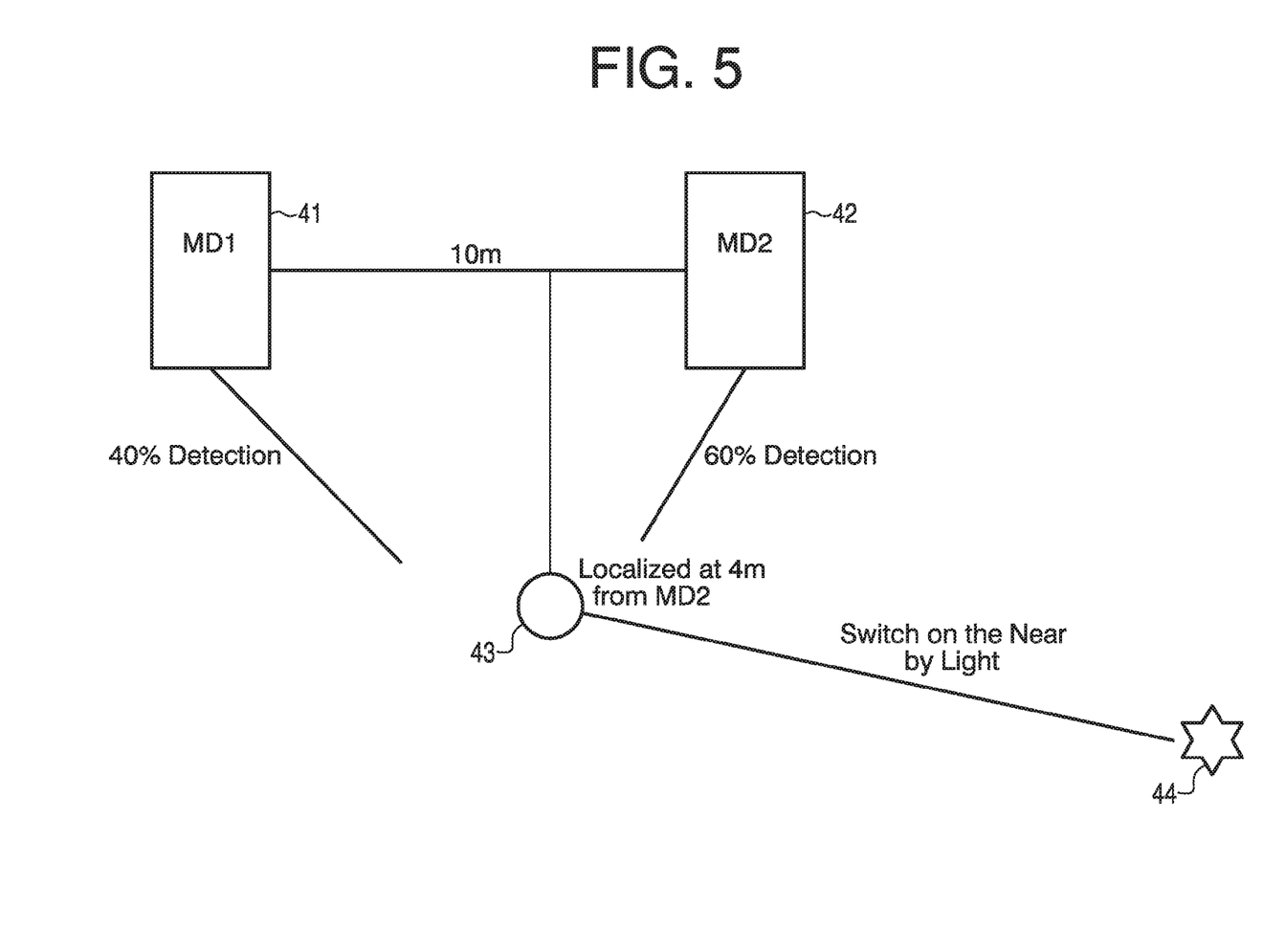
FIG. 5 is a diagram of a localization of motion.

A third feature may incorporate localization based on sensor data fusion, for energy monitoring. FIG. 5 is a diagram of a localization of motion. One may take, for instance, two motion detectors 41 and 42 placed, for instance, 10 m apart. Then if motion detector (MD1) 41 detects 40 percent and motion detector (MD2) 42 detects 60 percent, then a motion 43 would be localized in a 4 m range from motion detector 42. So a lighting 44 may be controlled in the detector 42 area. For instance, the near-by light 44 may be switched on.

Figure 6:
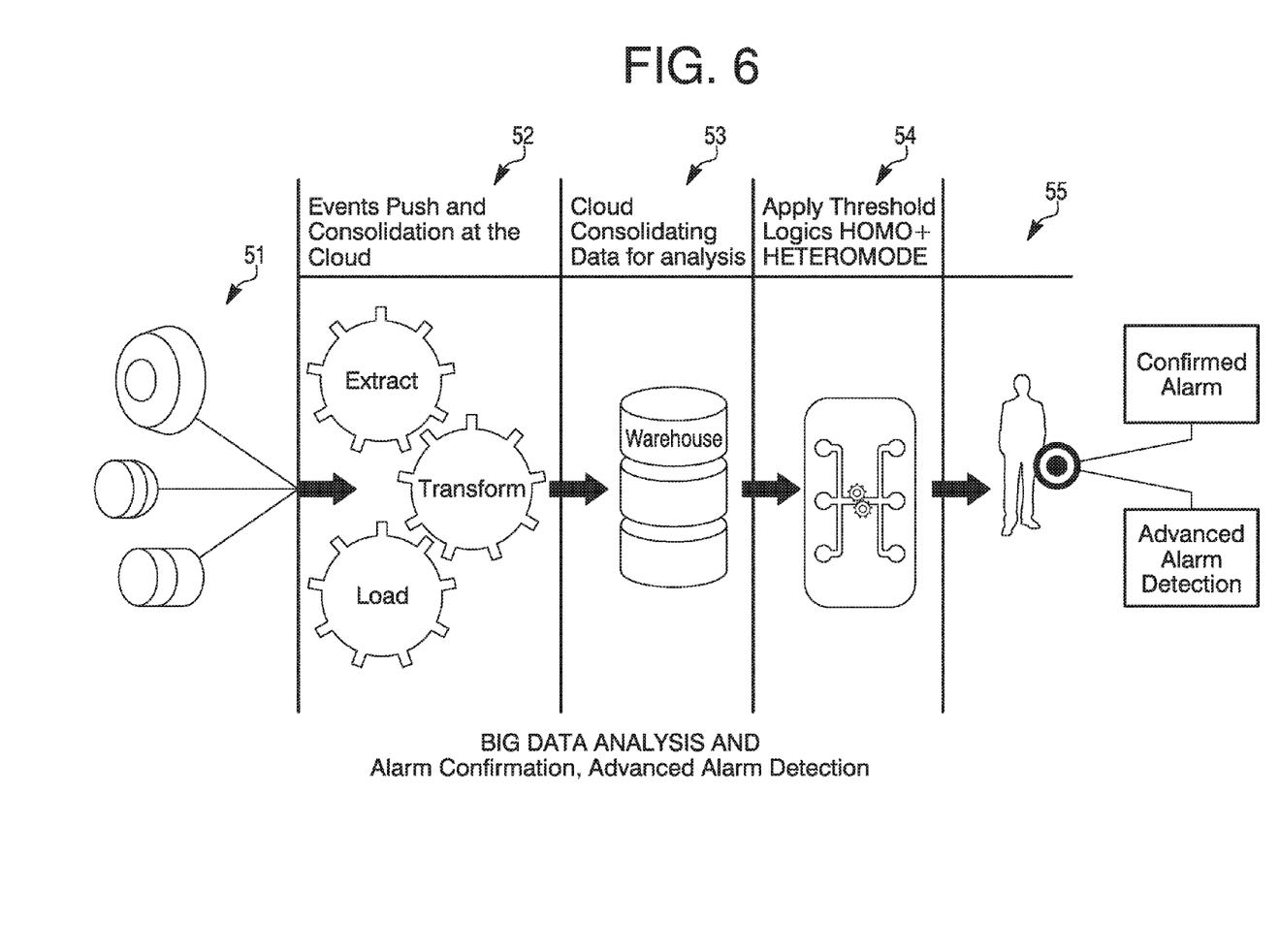
FIG. 6 is a diagram of a big data analysis layout.

A fourth feature may incorporate big data analysis derivation at a cloud. Sensor data fusion may be pushed to the cloud to apply "big data" analytics to derive a conclusion of confirmed alarm and advanced alarm detection. FIG. 6 is a diagram of a big data analysis layout. As shown in diagram, synchronous data obtained may be sent to a cloud's event hub. In the cloud, the big data analytics (e.g., extractions, and transformations and threshold logic) may be applied for a confirmed alarm. More specifically, data from a variety of (heterogeneous) sensors 51 may go to a section 52 where events are pushed and consolidated at a cloud in terms of extraction, transformation and loading. There may be a cloud consolidating data at a warehouse for analysis at a section 53. Threshold logic of a homomode plus heteromode may be applied to data at a section 54. At a section 55, there may an advance alarm detection and a confirmed alarm about an event or object.

Figure 7:
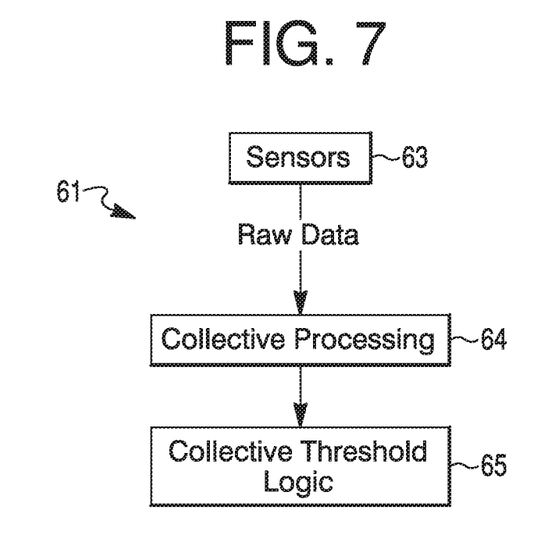
FIG. 7 is a diagram of a flow of data from sensors to collective processing and threshold logic.

FIG. 7 is a diagram of a system 61 having a flow of raw data from sensors 63 to a collective processing module 64 and to a collective threshold logic module 65. Sensors 63 may be homogeneous or heterogeneous.

Figure 8:
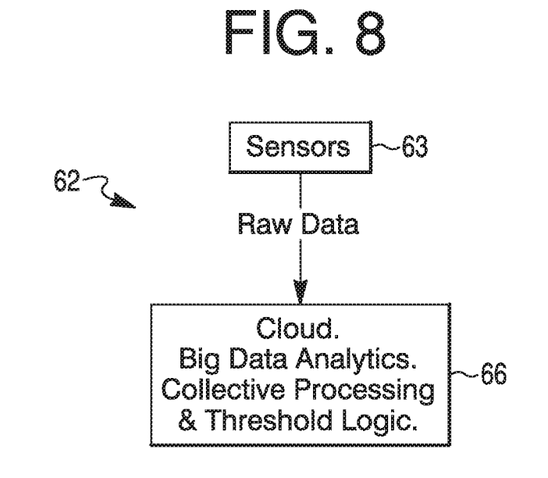
FIG. 8 is a diagram of a flow of data from sensors to a cloud where big data analyses may be applied.

FIG. 8 is a diagram of a system 62 having a flow of raw data from sensors 63 to a cloud 66 where big data analytics may be applied. Collective processing 64 may be done before or at cloud 66. Collective threshold logic 65 may be incorporated at cloud 66. Other analytics may be performed at cloud 66.

The present approach may have a software component. A stack level may be "edge", that is, a hardware device with embedded software that can be connected securely to the cloud via a wired or wireless connection. The software type may be embedded. The software may run in a device/unit (e.g., firmware). The present approach may incorporate one or more IoT (Internet of Things) components.

A stack level of a cloud may be a secure, scalable infrastructure for collecting, aggregating and storing data, allowing connected "things" to communicate, and making an offering/SaaS solution available, IaaS/PaaS, and data lakes.

To reiterate, implementation of a threshold comparator logic idea from multiple sensors may be used. Instead of a threshold comparison based on the application of probability at each sensor level and feeding the data to the threshold logic, the present approach may take the raw data from each of the sensor and apply a collective threshold logic. An issue with probability is that the coefficients used for opinion filters may be fixed and may make the decisions static. The present approach may take the raw data for the collective room response processing that would not necessarily involve the probability filters.

The present approach may also consider the individual sensor's decision into account and apply the collective threshold logic as well. An individual sensor's decision may be a trigger for an application of threshold logic. Always making the sensor data to go through opinion filters is not necessarily needed and would not consider the individual sensor's decision.

The present approach may have an indication not just about alarm detection, or false alarm reduction, but may also have a way to find the alarm localization. The present approach may use big data analytics which is based on map reduction methodology, and extractions, and would not necessarily rely on static mathematical probability filters at each sensor level.

Even though data fusion may be ordinarily used, the present approach may be more of tuning of a sensor's operating frequency to reconfirm alarms.

Sensors which operate in different frequencies may be considered for fusion in threshold logic; however, the present approach may consider all the sensors in all operating frequencies.

Global positioning system (GPS) may be used for location information; however, the present approach may use the relative raw threshold data between the sensors to find localization information of an alarm signal.

The present approach may take the individual sensors decision into account along with a collective threshold application. It may fuse the data of all sensors operating in all frequencies. It may use the relative raw data of the sensors for position information. It may speak about big data methodology of sensor data fusion. Ordinarily, multiple sensors may be used.

Even though one may use the already processed output data from various sensors and fuse the data, the present approach may use the raw input data from each of the sensors for collective processing and for applying collective threshold logic.

The phase relationship between the sensors data may be used for timing information between the sensors; however, the present approach does not necessarily require any phase relationship data.

The present approach may take the individual sensor's decision into account along with a collective threshold application. It may use the relative raw data of the sensors for position information. The present approach may speak about big data methodology of sensor data fusion.

Ordinarily, heterogeneous sensors may be used for data fusion, and one may use the already processed output data from various heterogeneous sensors and fuse the data. The present approach may use the raw input data from each of the heterogeneous sensors for collective processing and for applying collective threshold logic.

Sensors used in a heterogeneous context in an ordinary manner may be related to a multimedia domain. The present approach may involve heterogeneous sensors in security domain use cases.

The present approach may take the individual sensor's decision into account along with a collective threshold application. The present approach may use the relative raw data of the sensors for position information. The present approach may deal with big data methodology of sensor data fusion. Big data analytics may be pursued at a cloud.

To recap, an approach may incorporate conveying fault messages from a plurality of detectors to a control panel, conveying raw microwave data and/or passive infrared (PIR) data from the plurality of detectors to the control panel, performing fusion of raw data from the plurality of detectors at the control panel, and processing alarm information from the data as fused at the control panel.

The approach may further incorporate the alarm information for alarm management.

The approach may further incorporate calculating an overall room response for alarm verification and detection compared against a normal scenario.

The plurality of detectors may incorporate at least an audio detector and a motion detector.

The approach may further incorporate fusing audio detector data and motion detector data at the control panel.

Individually X percent may be a threshold for alarm detection for the plurality of detectors. The plurality of detectors may incorporate n detectors. Each detector may have an individual percent of detection. The control panel may incorporate collective decision logic that adds the individual percentages of detection of the detectors into an output. "n" may be a positive integer.

If a sum of the individual percentages of detection of the n detectors exceeds a predetermined amount, then an alarm alert may be provided by the control panel.

The plurality of detectors may incorporate at least a first motion detector at a first location and a second motion detector at a second location. The first and second locations may be separated by D along a first straight line. The first motion detector may have an X percent detection of an object. The second motion detector may have a Y percent detection of the object. X plus Y may equal 100 percent. A location of the object may be situated at $(X/100)*D$ distance from the second location, on the first straight line connecting the first and second locations.

The location of the object may be situated at a G distance along a second straight line from the first straight line. The second straight line may be perpendicular to the first straight line at $(X/100)*D$ distance from the second location.

A light closest to the object may be switched on.

A sensor data fusion system may incorporate a plurality of sensors, and a panel connected the plurality of sensors. The panel may have an output being a fusion of raw data from the plurality of sensors.

Each sensor may have an X percent individual threshold for alarm detection. Each sensor may have a portion of a total of detection for collective decision logic as an output.

A first sensor of the plurality of sensors may be situated at a first position. A second sensor may be situated at a second position. The first sensor may have an X percent detection of an object. The second sensor may have a Y percent detection of the object. X percent plus Y percent may equal 100 percent. D may be a distance between the first and second positions. The object may be localized at $(X/100)*D$ from the first sensor.

At least two sensors may be heterogeneous.

A data analysis mechanism may incorporate a plurality of sensors, a consolation mechanism connected to the plurality of sensors, and a threshold logic panel connected to the consolation mechanism.

The consolation mechanism and the threshold logic panel may be situated in a cloud.

The consolation mechanism may consolidate raw data from the plurality of sensors. The threshold logic panel may apply threshold logic to consolidated data.

The threshold logic may be applied by the threshold logic panel to the consolidated data to confirm any alarms revealed by the consolidated data and to provide advanced alarm detection.

The threshold logic panel may apply homomode and heteromode threshold logic to the consolidated data from the consolation mechanism.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method of sensor data fusion, comprising:
conveying fault messages from a plurality of detectors to a control panel;
conveying raw microwave data and/or passive infrared (PIR) data from the plurality of detectors to the control panel;
performing fusion of raw data from the plurality of detectors at the control panel; and
processing alarm information from the data as fused at the control panel; and
wherein:
individually X percent is a threshold for alarm detection for the plurality of detectors;
the plurality of detectors comprises n detectors;
each detector has an individual percent of detection;

the control panel comprises collective decision logic that adds the individual percentages of detection of the detectors into an output; and n is a positive integer.

2. The method of claim 1, further comprising processing the alarm information for alarm management.

3. The method of claim 1, further comprising calculating an overall room response for alarm verification and detection compared against a normal scenario.

4. The method of claim 1, wherein the plurality of detectors comprises at least an audio detector and a motion detector.

5. The method of claim 4, further comprising fusing audio detector data and motion detector data at the control panel.

6. The method of claim 1, wherein if a sum of the individual percentages of detection of the n detectors exceeds a predetermined amount, then an alarm alert is provided by the control panel.

7. A method of sensor data fusion, comprising:

conveying fault messages from a plurality of detectors to a control panel;

conveying raw microwave data and/or passive infrared (PIR) data from the plurality of detectors to the control panel;

performing fusion of raw data from the plurality of detectors at the control panel; and processing alarm information from the data as fused at the control panel; and wherein:

the plurality of detectors comprises at least a first motion detector at a first location and a second motion detector at a second location;

the first and second locations are separated by D along a first straight line;

the first motion detector has an X percent detection of an object;

the second motion detector has a Y percent detection of the object;

X plus Y equals 100 percent;

a location of the object is situated at (X/100)*D distance from the second location, on the first straight line connecting the first and second locations.

8. The method of claim 7, wherein:

the location of the object is situated at a G distance along a second straight line from the first straight line; and the second straight line is perpendicular to the first straight line at (X/100)*D distance from the second location.

9. The method of claim 8, wherein a light closest to the object is switched on.

10. A sensor data fusion system comprising:

a plurality of sensors; and a panel connected the plurality of sensors; and wherein:

the panel has an output being a fusion of raw data from the plurality of sensors;

a first sensor of the plurality of sensors is situated at a first position; and a second sensor is situated at a second position;

the first sensor has an X percent detection of an object;

the second sensor has a Y percent detection of the object;

X percent plus Y percent equals 100 percent;

D is a distance between the first and second positions; and the object is localized at (X/100)*D from the first sensor.

11. The system of claim 10, wherein:

each sensor has an X percent individual threshold for alarm detection; and each sensor has a portion of a total of detection for collective decision logic as an output.

12. The system of claim 10, wherein at least two sensors can be heterogeneous.

13. A data analysis mechanism comprising:

a plurality of sensors;

a consolation mechanism connected to the plurality of sensors; and a threshold logic panel connected to the consolation mechanism; and wherein:

individually X percent is a threshold for alarm detection by the plurality of sensors;

each sensor has an individual percent of detection;

the consolidation mechanism comprises collective decision logic that adds the individual percentages of detection of the sensors into an output; and the threshold logic panel determines whether the output exceeds the threshold to result in an alarm alert.

14. The mechanism of claim 13, wherein the consolation mechanism and the threshold logic panel are situated in a cloud.

15. The mechanism of claim 13, wherein:

the consolation mechanism consolidates raw data from the plurality of sensors; and the threshold logic panel applies threshold logic to consolidated data.

16. The mechanism of claim 15, wherein the threshold logic is applied by the threshold logic panel to the consolidated data to confirm any alarms revealed by the consolidated data and to provide advanced alarm detection.

17. The mechanism of claim 16, wherein the threshold logic panel applies homomode and heteromode threshold logic to the consolidated data from the consolation mechanism.

* * * * *